March 26, 1929.  J. TAKACS  1,706,682
EYEGLASS SHIELD
Filed May 2, 1928
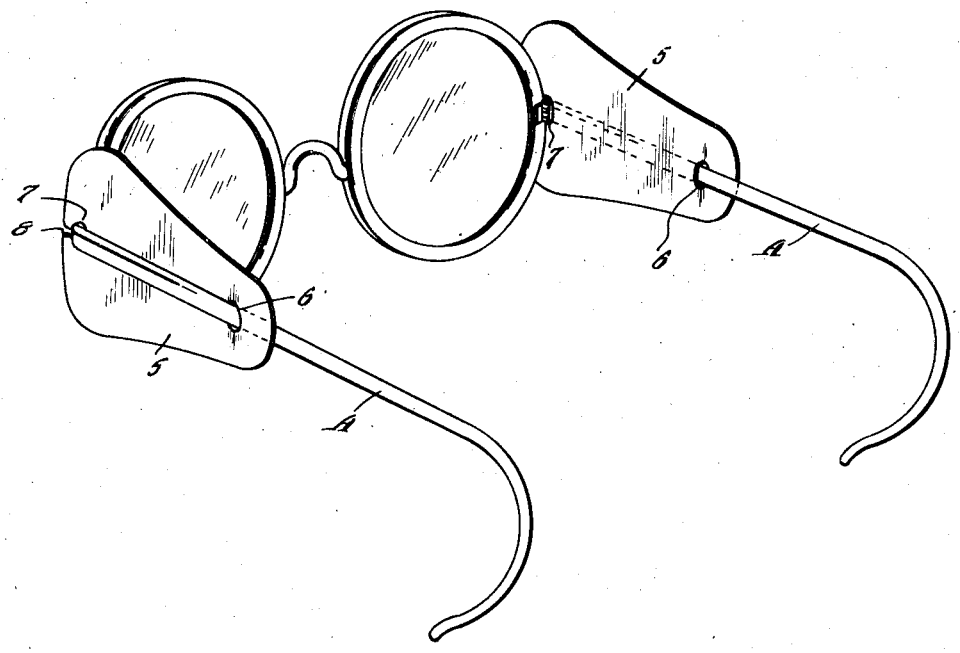
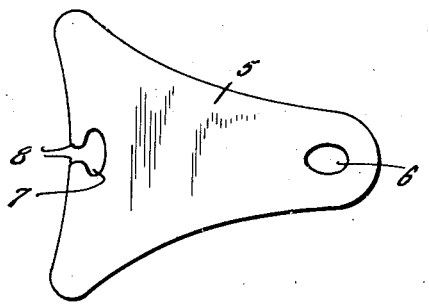
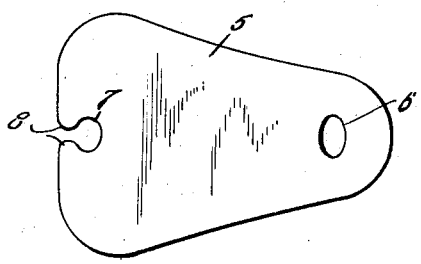
Inventor
Julius Takacs
By Clarence A. O'Brien
Attorney Patented Mar. 26, 1929.

1,706,682

UNITED STATES PATENT OFFICE.

JULIUS TAKACS, OF SOUTH BEND, INDIANA.

EYEGLASS SHIELD.

Application filed May 2, 1928. Serial No. 274,564.

This invention relates to new and useful improvements in shields for eyeglasses and aims to provide means for association with the usual pivotal ear pieces of a pair of spectacles directly adjacent the lens of the glasses so as to protect the eyes from dust, dirt or other injurious matter that can easily pass in back of the lens and enter the eyes of the wearer.

An important object of this invention is to provide a shield of this character that is of very simple construction that may be readily applied to a pair of eyeglasses without in any manner whatever altering the construction of the glasses or in affecting one's vision therethrough.

Other objects and advantages reside in the special construction, combination and arrangement of the various elements forming the invention as more fully hereinafter described and claimed, reference being had to the accompanying drawings forming part hereof, wherein like numerals refer to like parts throughout, and in which:

In the drawings:

Figure 1 is an inner side perspective of a conventional pair of eyeglasses equipped with a pair of shields constructed in accordance with the present invention, Figure 2 is a plan view of one design of shield, and Figure 3 is a similar view of a modified form of shield.

Now having particular reference to the drawings my novel shield consists of an oblong disk 5 of isinglass, celluloid, mica, cardboard, rubber or other suitable material of a predetermined length and width and of any desired shape preferably that as disclosed in either Figures 2 and 3, the shape depending upon the nature of the glasses as well as the adaptability to various users.

The said shield may be of any desired color and transparent, translucent, or foraminous. It is preferable however, that the width of the shield at their forward ends be such as to cover the side of the eye to prevent dirt, dust and the like from passing between the sides of the lens and one's eye. The rear end of the shield is formed with a suitable shaped opening 6 so as to permit the ear piece or stem of the glasses A to be arranged. The forward end of the shield intermediate its upper and lower edges is formed with a notch 7 of rounded or oval shape at its inner end and of contracted area at its outer end so as to provide lips 8—8 at opposite edges of the notch for engagement over opposite edges of the hinged joints between the ear piece and the adjacent ends of the glasses.

As clearly disclosed in Figure 1 a pair of these shields is provided for arrangement upon the ear pieces of a pair of eyeglasses so as to protect both eyes of the wearer.

It will thus be seen that I have provided a novel and simple as well as useful shield for eyeglasses and even though I have herein shown and described the invention as being of a certain structure it is nevertheless to be understood that some changes may be made therein without affecting the spirit or scope of the appended claim, and I accordingly claim all such forms of the device to which I am entitled.

Having thus described my invention, what I claim as new is:

In a side shield for eyeglasses of a single piece plate member of an oblong design having an opening in one end for receiving one of the ear stems of a pair of eyeglasses, the forward end of the plate intermediate its upper and lower edges being formed with a notch for engagement over the upper and lower edges of the ear piece adjacent its hinged connection with the adjacent lens of the glasses, the forward end of the notch being contracted to provide ears for engagement over the front of the ear piece adjacent said hinge connection to prevent rearward sliding movement of the plate upon said ear piece.

In testimony whereof I affix my signature.

JULIUS TAKACS.